United States Patent
Shirakawa (10) Patent No.: US 7,663,549 B2
(45) Date of Patent: Feb. 16, 2010

(54) INCOMING DIRECTION ESTIMATION APPARATUS

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/889,903

(22) Filed: Aug. 17, 2007

(65) Prior Publication Data

US 2008/0007455 A1 Jan. 10, 2008

Related U.S. Application Data

(63) Continuation of application No. PCT/JP2005/002448, filed on Feb. 17, 2005.

(51) Int. Cl.
*G01S 5/02* (2006.01)
*G01S 5/04* (2006.01)
(52) U.S. Cl. .................. 342/443; 342/417; 342/437
(58) Field of Classification Search .................. 342/385, 342/417, 437, 442, 443
See application file for complete search history.

(56) References Cited

U.S. PATENT DOCUMENTS

| | | | |
|---|---|---|---|
| 3,633,205 | A | 1/1972 | Lee et al. |
| 5,600,326 | A | 2/1997 | Yu et al. |
| 5,657,027 | A | 8/1997 | Guymon, II |
| 5,966,092 | A | 10/1999 | Wagner et al. |
| 6,476,756 | B2 | 11/2002 | Landt |
| 6,600,443 | B2 | 7/2003 | Landt |

FOREIGN PATENT DOCUMENTS

| | | |
|---|---|---|
| JP | 10-513570 | 12/1998 |
| JP | 2000-230974 | 8/2000 |
| JP | 2001-91616 | 4/2001 |
| JP | 2004-228615 | 8/2004 |
| JP | 2005-503531 | 2/2005 |
| WO | 2004/090567 A1 | 10/2004 |

OTHER PUBLICATIONS

International Search Report issued Apr. 4, 2005 in PCT Application No. PCT/JP2005/002448 (2 pp).
M. Mitsumoto et al., "A Low Elevation Target Height Measurement Method Using a Complex Angle Error Signal in a Phase Monopulse System" Electronics and Communications in Japan, Part 1, vol. 80, No. 9, Sep. 1997; pp. 25-32.
L. Taïeb et al., "Optimization of direction finders by Genetic Algorithms" IEEE Conference on Genetic Algorithms in Engineering Systems: Innovations and Applications, 1995: pp. 23-29.

(Continued)

*Primary Examiner*—Dao L Phan (57) ABSTRACT

An incoming direction estimation apparatus estimates an incoming direction of a radar wave using three or more sensors or antennas simultaneously. An arithmetic expression for estimating an incoming direction of a radar wave is configured as $\sin^{-1}((1/2\pi a)*\tan^{-1} b)$. The "a" is $d/\lambda$ determined by an antenna interval and by a wavelength $\lambda$ of a carrier, or such, carrying the radar wave. A simultaneous use of three antennas makes it possible to set the a as a value depending on a value $d_0 = a_0 \lambda$ based on the interval between first antennas and value $d_1 = a_1 \lambda$ based on the interval between second antennas. Therefore, if a wide field of vision of an incoming direction is needed, it is only necessary to adjust $(d_1 - d_0)/\lambda = (a_1 - a_0)$, in place of the absolute interval of antennas $a = d/\lambda$, thereby making it possible to lessen a limitation on the design of antennas and set a field of vision of the incoming direction appropriately.

14 Claims, 7 Drawing Sheets

OTHER PUBLICATIONS

Supplementary European Search Report issued in corresponding European Patent Application No. 05719250.2 on Sep. 3, 2008.

Japanese Office Action mailed on Aug. 4, 2009 and issued in corresponding Japanese Patent Application 2007-503523.

European Search Report issued Sep. 30, 2009 in corresponding European Patent Application 09166013.4.

INCOMING DIRECTION ESTIMATION APPARATUS

CROSS REFERENCE TO RELATED APPLICATION

This application is a continuation of international PCT application No. PCT/JP2005/002448 filed on Feb. 17, 2005.

BACKGROUND OF THE INVENTION

1. Field of the Invention

The present invention relates to an incoming direction estimation apparatus.

2. Description of the Related Arts

Figure 1:
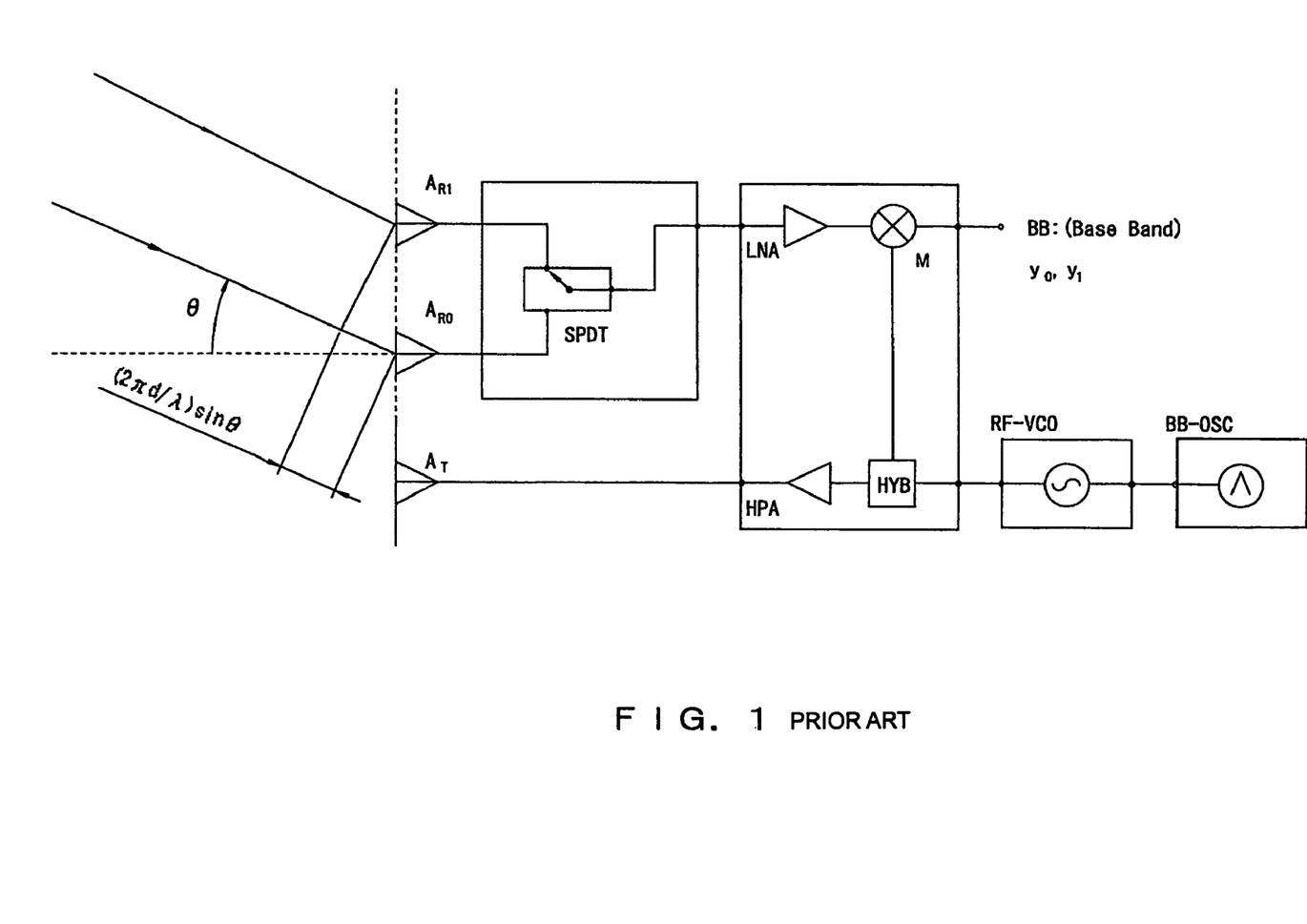
FIG. 1 is a diagram showing a mono-pulse radar as an example of a conventional incoming direction estimation apparatus.

FIG. 1 is a diagram showing a mono-pulse radar as an example of a conventional incoming direction estimation apparatus.

This apparatus is a system comprising one transmission antenna $A_T$, two reception antennas $A_{R0}$ and $A_{R1}$, an interface module (this comprisal adopts a single-pole, double-throw (SPDT)), which interfaces the reception antennas, and a radio frequency (RF) unit, an RF unit constituted by a transceiver and receiver, an RF oscillator, a base band (BB) oscillator, a BB module (not shown herein) comprising an analog to digital (A/D) converter, et cetera, and a signal processing apparatus (also not shown herein) comprising a central processing unit (CPU) and such. A radar wave transmitted from the antenna $A_T$ is received by the antennas $A_{R0}$ and $A_{R1}$ after being reflected on an angle measurement target. The radar wave transmitted from the antenna $A_T$ uses an RF signal that is a resultant of an oscillation frequency of the RF oscillator RF-VCO being modified by a signal of a triangular wave oscillated and emitted by the base band oscillator BB-OSC, or the like wave, followed by being amplified by a high power amplifier (HPA). The radar wave received by the antennas $A_{R0}$ and $A_{R1}$ is led by way of the switch SPDT, amplified by the low noise amplifier (LNA), mixed with the transmission radar wave by the multiplier M and converted into a base band signal BB. Thus obtained base band signal BB is processed by the BB module and CPU that are placed in the later stage, and an incoming direction of the radar wave (named simply as "radar wave" hereinafter) reflected on the angle measurement target is estimated.

Assuming that the angle measurement target is positioned at an angle θ relative to the normal line direction of the antenna surface (angle measurements are made clockwise with illustrated normal line as 0 degrees), a signal x(t) incoming from the target at a clock time t is received by the antennas $A_{R0}$ and $A_{R1}$, and down-converted, thereby becoming a base band signals $y_0(t)$ and $y_1(t)$ as the following expressions:

$$y_0 = x + n_0 \tag{1.1}$$

$$y_1 = x\exp[j2\pi\alpha \sin\theta] + n_1 \tag{1.2}$$

where $n_0(t)$ and $n_1(t)$ are noise components and t is omitted for simplicity of an expression; and α is d/λ assuming that the antenna interval is d, the wavelength of an un-modulated output signal (named as "carrier signal" hereinafter) from the RF-VCO is λ, and j is an imaginary unit. In this case, the simplest method for calculating the θ among conceivable methods is defining $$\Sigma y = y_0 + y_1,$$

$$\Delta y = y_0 - y_1,$$

$$\Sigma n = n_0 + n_1, \text{ and}$$

$$\Delta n = n_0 - n_1 \tag{1.3}$$

followed by calculating a ratio of Δy to Σy to obtain:

$$\frac{\Delta y}{\Sigma y} = \frac{x\{1 - \exp[j2\pi\alpha\sin\theta]\} + n_0 - n_1}{x\{1 + \exp[j2\pi\alpha\sin\theta]\} + n_0 + n_1} \tag{1.4}$$

$$= \frac{-2jx\sin[\pi\alpha\sin\theta]\exp[j\pi\alpha\sin\theta] + \Delta n}{2x\cos[\pi\alpha\sin\theta]\exp[j\pi\alpha\sin\theta] + \Sigma n}$$

$$= \frac{-j\tan[\pi\alpha\sin\theta] + \Sigma\varepsilon}{1 + \Sigma\varepsilon};$$

and therefore the θ can be calculated by using the following expression provided that Δε and Σε are sufficiently small.

$$\theta \approx \sin^{-1}\left\{\frac{1}{\pi\alpha}\tan^{-1}\left[-\text{Im}\left(\frac{\Delta y}{\Sigma y}\right)\right]\right\}; \tag{1.5}$$

where the following is defined:

$$\Sigma\varepsilon \equiv \frac{\Sigma n}{2x\cos[\pi\alpha\sin\theta]\exp[j\pi\alpha\sin\theta]} = \frac{\Sigma n}{\Sigma y - \Sigma n}, \tag{1.6}$$

and $$\Delta\varepsilon \equiv \frac{\Delta n}{2x\cos[\pi\alpha\sin\theta]\exp[j\pi\alpha\sin\theta]} = \frac{\Delta n}{\Sigma y \Sigma n} \tag{1.7}$$

Note that Im takes an imaginary number part of an argument in the above expression. Now, let it be assumed that γ is expressed by $\gamma = -\text{Im}(\Delta y/\Sigma y)$, then it is necessary to set it at $\alpha = 1/2$ in order to be able to use the entirety of a domain of $\sin^{-1}$ (where $\sin^{-1}(x)$; $|x| \leq 1$) if $\tan^{-1}(\gamma)$ changes when trying to obtain a maximum field of view (FOV) (i.e., a field angle of a radar) because the value range of the $\tan^{-1}(\gamma)$ determining the domain of definition of $\sin^{-1}$ is $|\tan^{-1}(\gamma)| \leq \pi/2$. It is, however, difficult to set the α at such a value because of a consideration of a system gain and an electromagnetic coupling between the antennas, and therefore the α is usually set at about 1 to 2. That is, $\alpha = d/\lambda$ where the antenna interval is d and a wavelength of the carrier signal is λ, and therefore the antennas must be placed in an extremely small interval in the unit of millimeter in order to accomplish a value such as $\alpha = 1/2$ by a short wave signal especially a radar or such. Too small an antenna interval, however, generates an electromagnetic coupling between the two antennas, losing an independence of two reception signals that are supposed to be obtained by essentially maintaining an exact phase difference indicated by the above expressions 1.1 and 1.2, and therefore an approximation represented by the expression 1.5 is no longer applicable even if Δy/Σy is forcibly transformed, resulting in making it difficult to estimate the θ accurately. Meanwhile, a try to obtain a sufficient system gain needs to take a sufficient gain of the antennas, generally requiring a large area size for each antenna. Consequently, a try to obtain a sufficient system gain makes the antennas become large, creating a situation of making it impossible to minimize the antenna interval.

Accordingly, one considers a way of obtaining a maximum FOV based on such an α (e.g., FOV≈±23° in the case of α=1.25), in which case, however, an angle must be measured by using the entire value zone of $\tan^{-1}(\gamma)$. The $\tan^{-1}(\gamma)$, however, is a nonlinear function in which a derivative becomes smaller than "1" with a distance from the original point, and the nonlinearity of the $\tan^{-1}(\gamma)$ further influences the $\sin^{-1}$ that is also a nonlinear function adversely to a large $\gamma$ (i.e., to a signal incoming from an angle close to an FOV limit), thus resulting in fundamentally degrading accuracy of a measurement angle.

Incidentally, there is a known technique (per reference patent documents 1 and 2) of configuring an array by placing three element antennas in irregular intervals, carrying out a conventional mono-pulse angle measurement by using two sets of antennas, and applying an averaging operation and such, in order to reduce an error nearby the FOV. Except that the error reduction method of the known technique is an extension of the conventional mono-pulse method using two signals after all.

In summary, the conventional incoming direction estimation apparatus has been faced with the following problems:

1. A mono-pulse apparatus employing two reception-use sensors are commonly used for an apparatus estimating a direction of arrival (DOA) of a single signal by using a signal sensor comprising a sensor array. The apparatus, however, has a limited field of view (FOV) constrained by an absolute interval between the sensors and, moreover, a direction estimation error increases toward the edges of the FOV in terms of the primary value of an inverse triangular function. Meanwhile, a try to increase the FOV is limited by a difficulty of setting individual sensors less than a certain interval due to the problem of physical size, gain or electromagnetic coupling of the individual sensors.

2. There is a known technique (per reference patent documents 1 and 2) as a proposal for correcting a DOA error nearby the FOV among the problems noted in the above paragraph 1. These apparatuses place three or more antennas in irregular intervals, configures two sets of common mono-pulse apparatuses by selecting two antennas among the three or more antennas, applies to averaging or such to two DOAs $\theta_0$ and $\theta_1$ that are obtained from each mono-pulse apparatus and judges that a correct DOA is obtained only if the both of them are identical. In this method, however, the FOV per se is still controlled by the absolute interval between the antennas, thus failing to provide a fundamental solution to the problem of the above paragraph 1. Another problem is that an essential degradation of an accuracy of measurement angle cannot be avoided because it is basically a simple combination of two sets of conventional mono-pulse apparatuses.

Patent document 1: Japanese Patent Application No. 2004-228615

Patent document 2: Laid-Open Japanese Patent Application Publication No. 2000-230974

SUMMARY OF THE INVENTION

The object for the present invention is to provide an incoming direction estimation apparatus capable of obtaining a wide field of view (FOV) and providing a high accuracy of angle measurement.

An incoming direction estimation apparatus according to the present invention comprises: at least three sensors for receiving a signal from a target by being placed so as to make $|a_1 - a_0|$ equal to or less than 1/4 when defining a distance between first sensors as $d_0 = a_0 * \lambda$ and a distance between second sensors as $d_1 = a_1 * \lambda$, where the $a_0$ and $a_1$ are set as constant and the $\lambda$ is defined as wavelength of a carrier, or such, carrying a reception signal; and an estimation unit for estimating an incoming direction of the signal by using the at least three sensors simultaneously.

The present invention is contrived to reduce an apparent value range of $\tan^{-1}(\gamma)$ included in an arithmetic expression used for estimating a direction by using signals from three (or more) sensors simultaneously and bring a necessary field of view into a zone where a calculation error is fundamentally small. This in turn makes it possible to widen an FOV per se.

DESCRIPTION OF THE PREFERRED EMBODIMENTS

While the present invention is applicable to other incoming direction estimation apparatuses such as a sonar in lieu of a mono-pulse radar described above, a description herein exemplifies a mono-pulse radar in terms of a comparison of the conventional technique, and exemplifies the case of N=3, where N is the number of sensors.

Figure 2:
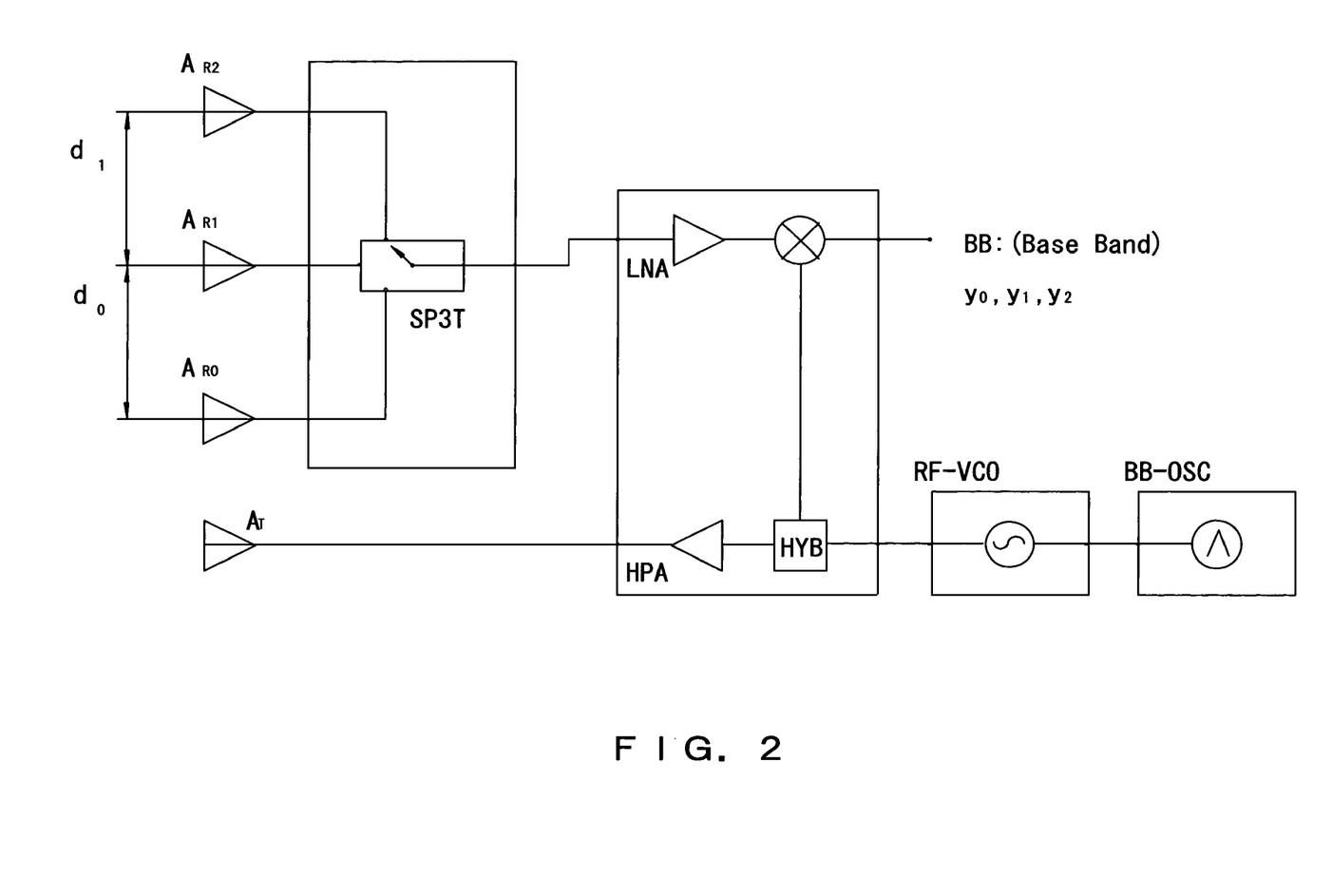
FIG. 2 is a diagram of an outline comprisal of a mono-pulse radar incoming direction estimation apparatus according to a preferred embodiment of the present invention.

FIG. 2 is a diagram of an outline comprisal of a mono-pulse radar incoming direction estimation apparatus according to a preferred embodiment of the present invention.

In the showing of FIG. 2, the same component sign is assigned to the same constituent component as one shown in FIG. 1 and the description thereof is omitted here.

The configuration shown by FIG. 2 is equipped with three reception antennas. A switch SP3T (single-pole, 3-throw) changes over radar wave reception signals from the three antennas sequentially and transmits them to a later stage.

Where defining antenna intervals of three antennas ($A_0$, $A_1$ and $A_2$) as: $d_0 = a_0 \lambda$ between the $A_0$ and $A_1$, and $d_1 = a_1 \lambda$ between the $A_1$ and $A_2$, a baseband component of a signal received at each antenna is given by the following expression (See FIG. 1, expressions 1.1 and 1.2.):

$$y_0 = x + n_0 \qquad (2.1.1)$$

$$y_1 = x \exp(j 2\pi a_0 \sin\theta) + n_1 \qquad (2.1.2)$$

-continued $$y_2 = x\exp[j2\pi(a_0 + a_1)\sin\theta] + n_2 \quad (2.1.3)$$

Then, calculations of $$\frac{y_1}{y_0} = \frac{x\exp(j2\pi a_0 \sin\theta) + n_1}{x + n_0} \quad (2.1.4)$$

$$= \frac{\exp(j2\pi a_0 \sin\theta) + n_1/x}{1 + n_0/x}$$

and $$\frac{y_2}{y_1} = \frac{x\exp[j2\pi(a_0 + a_1)\sin\theta] + n_2}{x\exp(j2\pi a_0 \sin\theta) + n_1} \quad (2.1.5)$$

$$= \frac{\exp(j2\pi a_1 \sin\theta) + n_2/x\exp(j2\pi a_0 \sin\theta)}{1 + n_1/x\exp(j2\pi a_0 \sin\theta)}$$

obtains $$\frac{y_2}{y_1} \Big/ \frac{y_1}{y_0} = \frac{y_2 y_0}{y_1^2} \quad (2.1.6)$$

$$= \frac{\exp(j2\pi a_1 \sin\theta) + n_2/x\exp(j2\pi a_0 \sin\theta)}{\exp(j2\pi a_0 \sin\theta) + n_1/x}$$

$$\frac{1 + n_0/x}{1 + n_1/x\exp(j2\pi a_0 \sin\theta)}$$

$$= \frac{\exp[j2\pi(a_1 - a_0)\sin\theta] + n_2/x\exp(j4\pi a_0 \sin\theta)}{1 + n_1/x\exp(j2\pi a_0 \sin\theta)}$$

$$\frac{1 + n_0/x}{1 + n_1/x\exp(j2\pi a_0 \sin\theta)}$$

Therefore, if an S/N ratio is sufficiently large, the following is possible $$\frac{y_2 y_0}{y_1^2} \cong \exp[j2\pi(a_1 - a_0)\sin\theta] \quad (2.1.7)$$

and accordingly proceeding to calculate an angle of a target by the following expression 2.1.8, and:—

(1) First, defining as $|a_1 - a_0| \geq 1/4$ makes it possible to expand only an FOV without excluding an angle measurement by using all value zone of $\tan^{-1}(\gamma)$ as in the case of the conventional technique when calculating $\arg(y_2 y_0/y_1^2)$ substituted by $\gamma = \mathrm{Im}(y_2 y_0/y_1^2)/\mathrm{Re}(y_2 y_0/y_1^2)$ and by using $\arg(\gamma) = \tan^{-1}(\gamma)$. Note that it means the Im takes an imaginary part of an argumant and the Re takes a real part of the argumant. The arg represents an angle on a complex plane.

(2) Moreover, the domain of $\sin^{-1}(x)$ is $|x| \leq 1$, and therefore it is possible to improve angle measurement accuracy while securing a larger FOV than the conventional method by limiting to a zone where a relationship of $\gamma - \tan^{-1}(\gamma)$ is relatively highly linear, e.g., excluding a zone outside the good-linearity-domain of $\sin^{-1}(x)$ by setting, for example, $|a_1 - a_0| \leq 1/4$, i.e., $|a_1 - a_0| = 1/2\pi$ for example, or multiplying $\tan^{-1}(\gamma)$ by a scaling.

$$\theta = \sin^{-1}\left[\frac{1}{2\pi(a_1 - a_0)} \arg\left(\frac{y_2 y_0}{y_1^2}\right)\right] \quad (2.1.8)$$

That is, a degradation of angle estimation accuracy caused by a problem of a principal value of a trigonometric function can be compensated and also an FOV can be expanded. Nor is there a necessity of correcting by obtaining a difference between DOAs by using an individual set of antennas.

Figure 3:
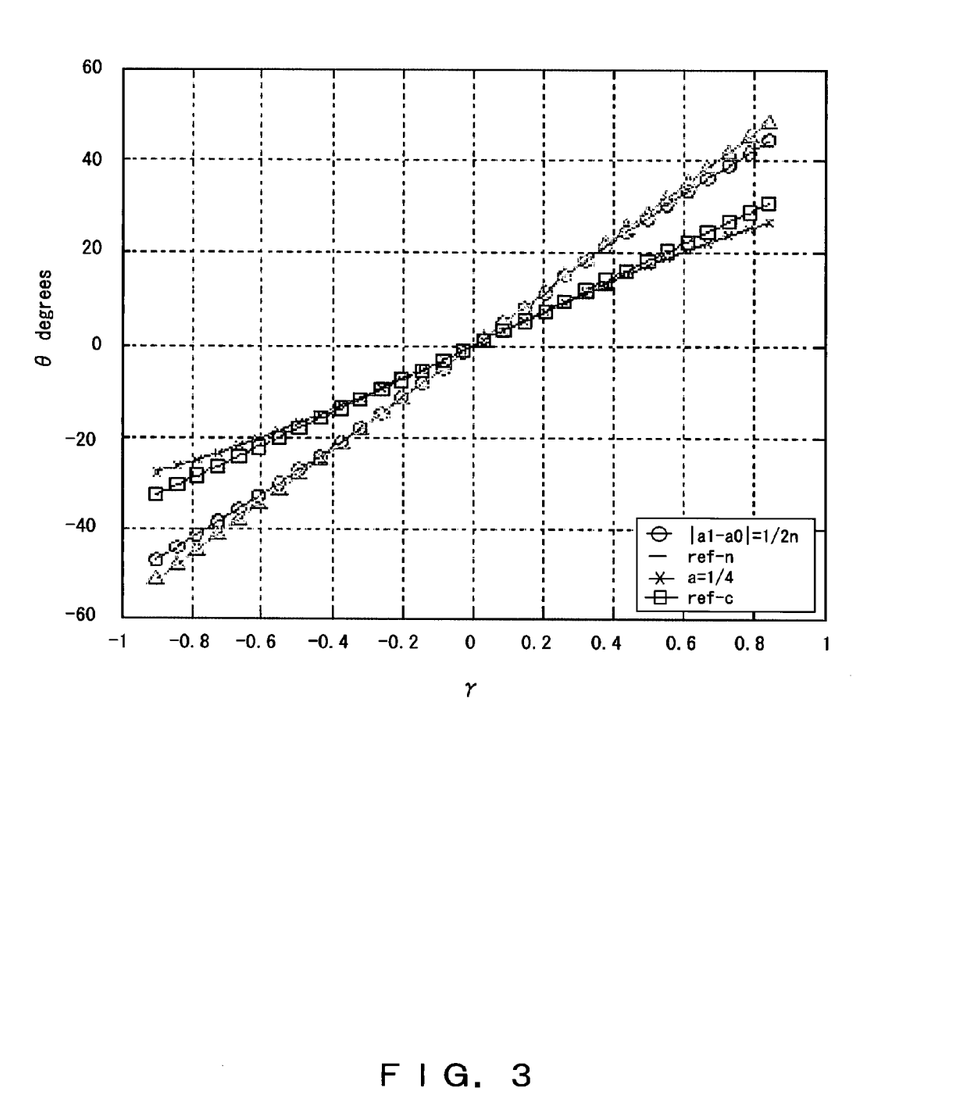
FIG. 3 is a diagram showing a comparison of the preferred embodiment ($\circ$: $|a_1 - a_0| = 1/2\pi$) of the present invention with a conventional system (x: a=1/4) (part 1)
Figure 4:
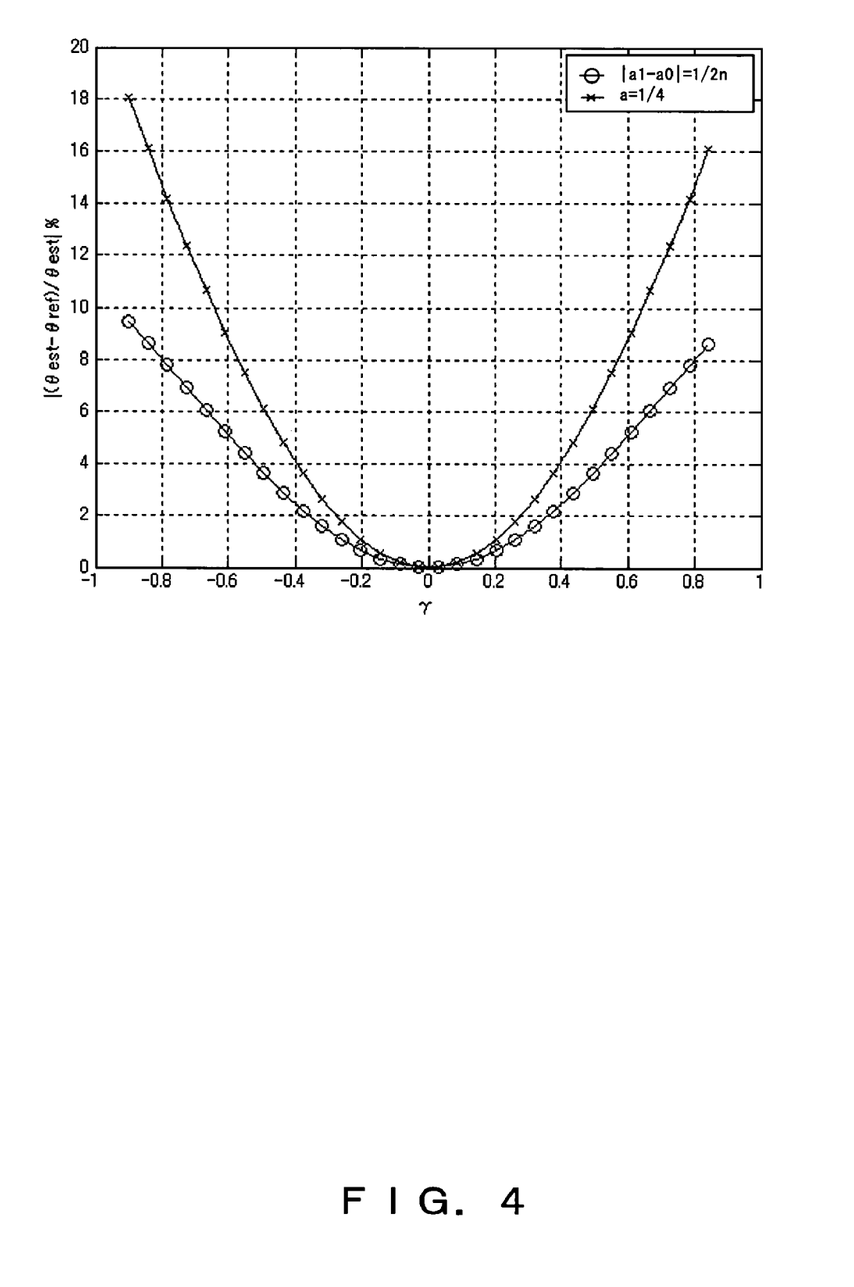
FIG. 4 is a diagram showing a comparison of the preferred embodiment ($\circ$: $|a_1 - a_0| = 1/2\pi$) of the present invention with a conventional system (x: a=1/4) (part 2)

FIGS. 3 and 4 each is a diagram showing a comparison of the preferred embodiment (o: $|a_1 - a_0| = 1/2\pi$) of the present invention with a conventional system (x: a=1/4).

The horizontal axis of FIGS. 3 and 4 shows $\gamma = -\mathrm{Im}(\Delta y/\Sigma y)$ for the conventional method and $\gamma = \mathrm{Im}(y_2 y_0/y_1^2)/\mathrm{Re}(y_2 y_0/y_1^2)$ for the preferred embodiment of the present invention. The vertical axis of FIG. 3 is a mono-pulse angle measurement value $\theta$ (i.e., the range of the top to bottom of each characteristic line is an FOV), and $\theta$est shown in FIG. 4 is a calculated value by means of a mono-pulse angle measurement, and $\theta$ref is a physical angle (i.e., the conventional method: ref-c and the present invention: ref-n in the showing of FIG. 3) of an angle measurement target in each method. Comparing the method of the embodiment of the present invention with the conventional method shown in FIG. 3, the method of the embodiment of the present invention apparently achieves a wider FOV (this example shows a measurement angle range of about two times of the conventional method) for a value of each $\gamma$, also obtaining the angle close to the actual angle (i.e., the physical angle). Meanwhile, FIG. 4 shows that a value of error for a value of each $\gamma$ increases with the absolute value of $\gamma$ for both of the methods. Describing another benefit of the present invention by referring to FIG. 3 and FIG. 4, the $\gamma$ at around 20° that is the FOV limit accomplished by the conventional method is about 0.6 for example, whereas the $\gamma$ in the case of measuring an angle at around 20° is about 0.4 according to the present invention, meaning that a relative error of the $\theta$ when measuring the same angle of 20° is about 9% for the conventional method, whereas it is 2% for the embodiment of the present invention, thus an improvement of about ⅕ reduction.

Since the conventional method is a mono-pulse angle measurement using two sets of antenna, the only way to extend the FOV is to narrow the absolute interval between the individual antennas, while is faced with a difficulty in avoiding a degradation of angle measurement accuracy nearby the end of the FOV. As for the FOV, furthermore, narrowing the absolute interval between the antennas is faced with serious problems in consideration of the physical size limit, electromagnetic coupling and gain, and an improvement of angle measurement accuracy by just averaging can never provide a fundamental solution. Contrarily, the preferred embodiment of the present invention has no problem with the absolute interval between antennas and therefore enables a setup for a highly flexible performance (e.g., an FOV can remain wide even if the absolute interval between antennas becomes large as a result of obtaining a large gain by designing large individual antennas). It is also easy to improve the angle measurement accuracy as shown in FIG. 4.

The present embodiment can be implemented by a program or circuit. In the case of implementing by a program, an inverse trigonometric function is usually incorporated as a scheme of a Taylor expansion (refer to the second term of left-hand side of the expression 2.2.1); it may, however, be substituted by a Pade expansion (refer to the third term of the left-hand side of the aforementioned expression). The Pade expansion is well known to provide a numerical stability and high accuracy than the Taylor expansion (e.g., set for $M \leq N+1$ or such), possibly providing a compensation effect in a calculation in the case in which a normal calculation could result in an error by exceeding a domain of a trigonometric function due to an influence of a noise or such. Note that a Pade approximation (expansion) can be implemented by a filter and therefore a hardware configuration makes it possible to reduce a calculation load.

$$f(x) = \sum_{i=0}^{L} a_i x^i = \sum_{i=0}^{M} p_i x^i \bigg/ \left[1 + \sum_{i=0}^{N} q_i x^i\right] \quad (2.2.1)$$

While the argument of $\sin^{-1}$ excluding coefficients of the expression 2.1.8 is $$\arg\left(\frac{y_3 y_1}{y_2^2}\right) = \tan^{-1}\left[\text{Im}\left(\frac{y_3 y_1}{y_2^2}\right) \bigg/ \text{Re}\left(\left(\frac{y_3 y_1}{y_2^2}\right)\right)\right] \equiv \tan^{-1}\gamma; \quad (2.3.1)$$

however, paying attention to the fact that $$\tan^{-1}\gamma = \sin^{-1}\frac{\gamma}{\sqrt{1+\gamma^2}}, \quad (2.3.2)$$

calculating the $\theta$ by using a correction coefficients $\{\beta_i\}$ determined by a method of least squares or such to define such as:

$$\theta = \sin^{-1}\left\{\frac{1}{2\pi(a_2 - a_1)}\sin^{-1}\frac{\sum_i \beta_i \gamma^i}{\sqrt{1+\gamma^2}}\right\} \quad (2.3.3)$$

makes it possible to further improve accuracy of an angle estimation because it is possible to give a correction only to the numerator. Incidentally, the range of integer i may be arbitrarily determined in consideration of accuracy, calculation load, et cetera.

Figure 5:
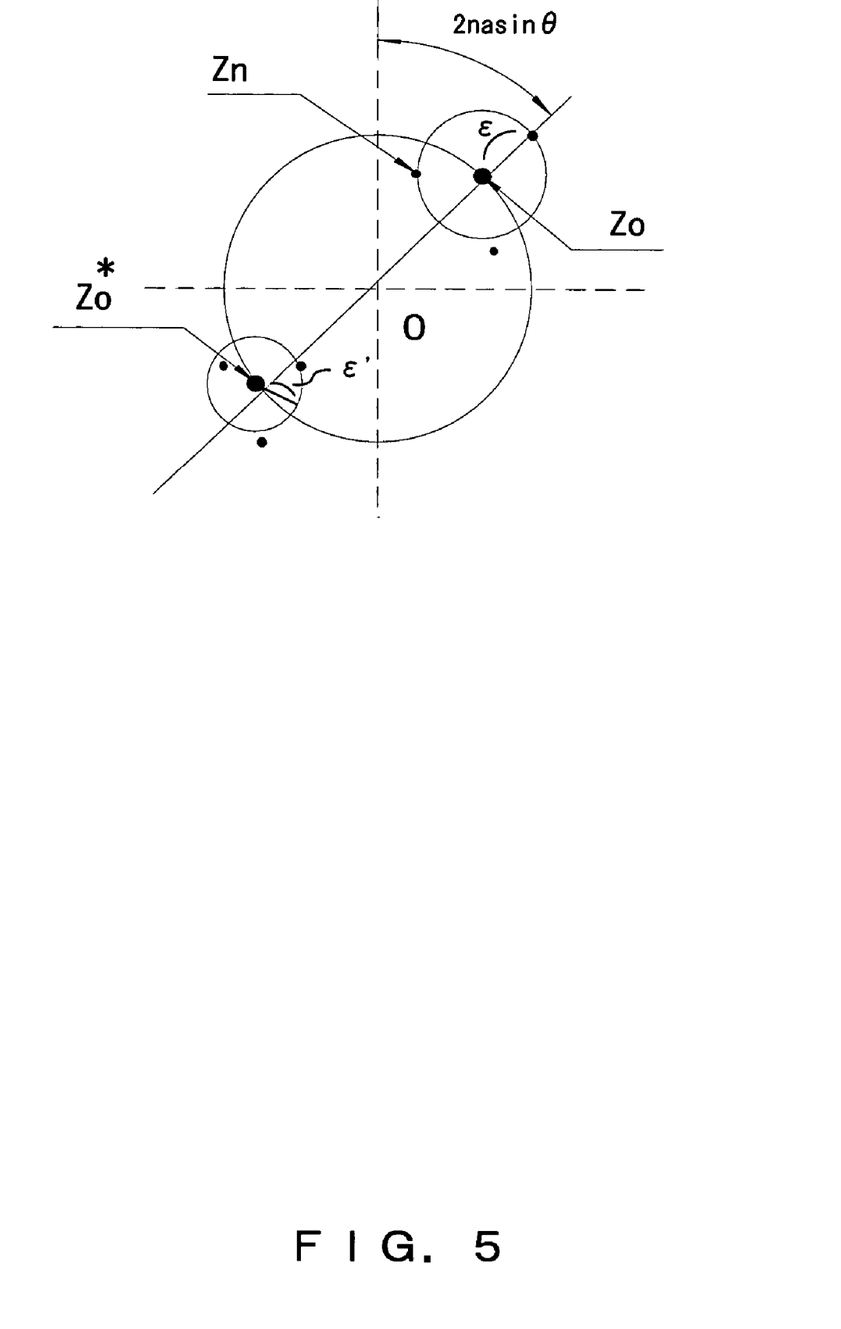
FIG. 5 is a diagram describing the case of applying the preferred embodiment of the present invention to a regular-interval array sensor (part 1)
Figure 6:
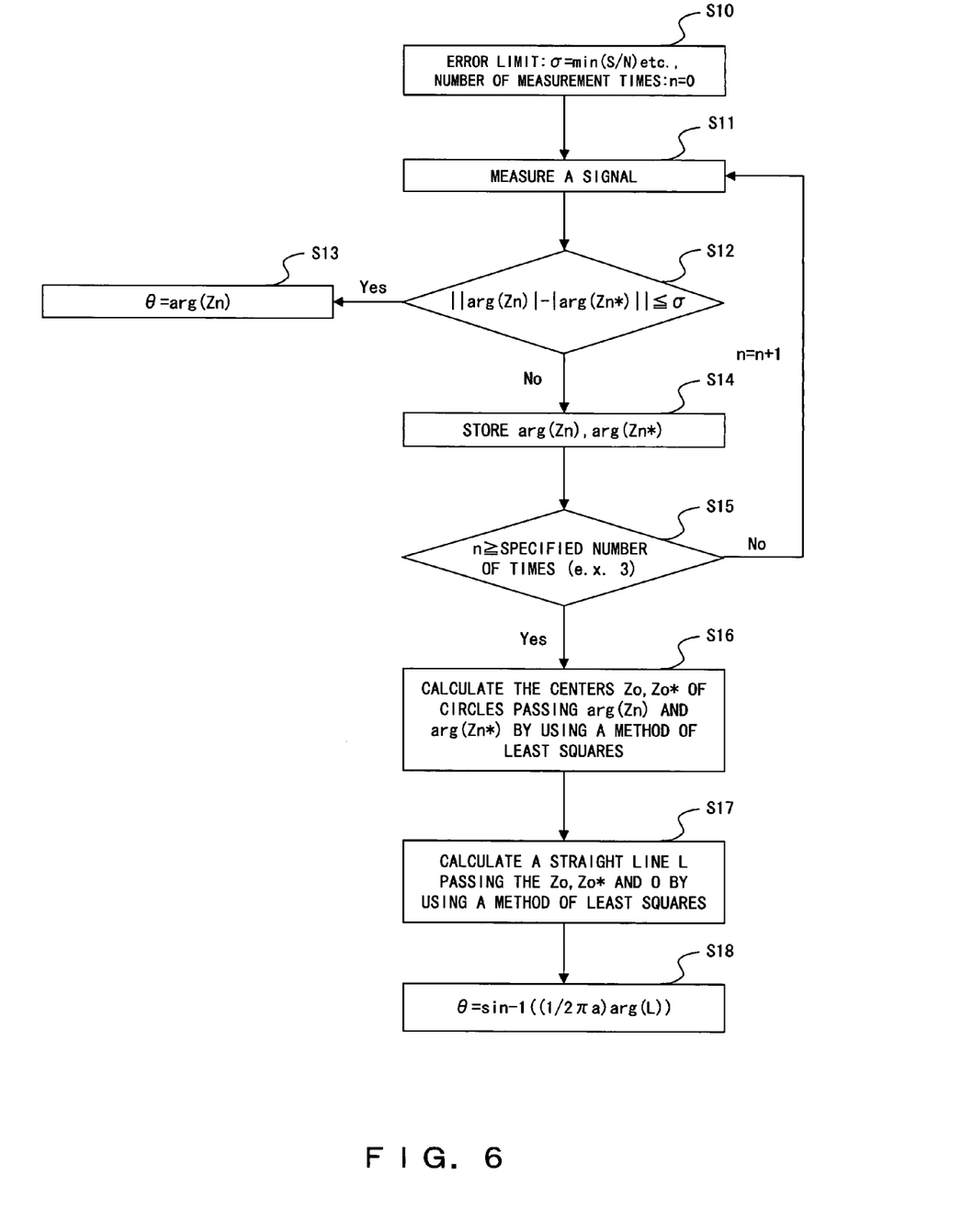
FIG. 6 is a diagram describing the case of applying the preferred embodiment of the present invention to a regular-interval array sensor (part 2)

FIGS. 5 and 6 each is a diagram describing the case of applying the preferred embodiment of the present invention to a regular-interval array sensor.

In the case of a regular-interval array sensor, when S/N ratio is sufficiently large, the expression is $$\frac{y_1 + y_2}{y_0} = \frac{x\exp(j2\pi a\sin\theta) + x\exp(j4\pi a\sin\theta) + n_1 + n_2}{x + n_0} \quad (2.4.1)$$
$$= \frac{\exp(j2\pi a\sin\theta) + \exp(j4\pi a\sin\theta) + (n_1 + n_2)/x}{1 + n_0/x}$$

$$\Box \exp(j2\pi a\sin\theta) + \exp(j4\pi a\sin\theta),$$

substituting $z = \exp(j2\pi a \sin\theta)$ and $(y_2 + y_1)/y_0 = b$ makes solutions z and z* (* means taking a complex conjugate) of a quadratic equation $z^2 + z - b = 0$ appear at the position of a conjugate symmetry on a Gauss plane. Accordingly, if the $\theta$s given by the following expression become identical while ignoring a sign, it is regarded as an appropriate value:

$$\theta = \sin^{-1}\left[\frac{1}{2\pi a}\arg\left(\frac{-1 \pm \sqrt{1+4b}}{2}\right)\right] \quad (2.4.2)$$

If both of them are not identical due to an influence of a calculation error and such, an angle formed by a straight line passing z, z* and "0" in terms of a method of least squares and a real or imaginary axis is regarded as $2\pi a \sin\theta$. Or, plotting z and z*, which are obtained by an n-time of measurements, on a unit circle, two circles defined by $|z_n - z_0| \leq \epsilon$ and $|z_n^* - z_0^*| \leq \epsilon'$ are obtained related to certain deviations ($\epsilon$, $\epsilon'$) and true solutions ($z_0$, $z_0^*$) as shown in FIG. 5. It is followed by calculating the center of them ($z_0$, $z_0^*$) by using a method of least squares or such, and an angle formed by a straight line, which passes these points and "0" in terms of a method of least squares, and a real axis or imaginary axis is regarded as $2\pi a \sin\theta$.

FIG. 6 is a process flow in the case of a regular interval array.

The step S10 sets an error limit $\sigma$ and the number of measurement times n=0. The error limit $\sigma$ is calculated by min (S/N), the minimum value of S/N ratio, or such for example. The step S11 measures a signal and the step S12 judges whether or not the absolute value of the difference between the absolute value of arg(Zn) and that of arg(Zn*) is less than or equal to the $\sigma$. If the judgment of the step S12 is "yes", an incoming angle is determined to be an $\sin^{-1}((1/2\pi a)$ arg(Zn)). If the judgment of the step S12 is "no", the step S14 stores the arg(Zn) and arg(Zn*), and the step S15 judges whether the number of measurement times n is equal to or more than a specified number of times, e.g., "3". If the judgment of the step S15 is "no", the process returns to the step S11 for measuring a signal. If the judgment of the step S15 is "yes", then the step S16 calculates the centers $z_0$ and $z_0^*$ of a circle passing the Zn and Zn* by applying a method of least squares, the step S17 calculates a straight line L passing the $z_0$, $z_0^*$ and "0" by applying a method of least squares, and the step S18 determines the incoming angle to be $\sin^{-1}((1/2\pi a)$ arg(L)).

In the case of a regular interval array, the expression 2.7.1 is obtained by changing a phase reference and an angle $\theta$ is calculated by using the expression 2.7.2. The same trigonometric function that requires a relatively large load among the elementary function can be used satisfactorily and therefore a program size can be a little smaller.

$$\frac{y_2 - y_0}{2jy_1} = \frac{x\exp(j2\pi a\sin\theta) - x\exp(-j2\pi a\sin\theta) + n_2 - n_0}{2j(x+n_1)} \quad (2.7.1)$$
$$= \frac{\sin(2\pi a\sin\theta) + (n_2 - n_0)/2jx}{1 + n_1/2jx}$$

$$\theta = \sin^{-1}\left\{\sin^{-1}\left[\frac{1}{2\pi a}\text{Re}\left(\frac{y_2 - y_0}{2jy_1}\right)\right]\right\} \quad (2.7.2)$$

By configuring a sensor array (where $|a_i - a_j| \geq 1/4$, or $|a_i - a_j| \leq 1/4$ for $\forall i$ and j (where $j \neq i$); either may be determined in consideration of a balance between an expansion of FOV and angle measurement accuracy) by lining up an N-piece of sensors (where $N \geq 3$) receiving a signal in an interval of $d_0 = a_0\lambda$ through $d_{N-2} = a_{N-2}\lambda$, where the wavelength of a carrier signal is $\lambda$, and setting three signals as one set (which is indicated by i, j, k) of all signals $y_1$ through $y_{N-1}$ that have been received by the individual sensors, a $\theta$ of the DOA is calculated by the following expression:

$$\theta = \sin^{-1}\left[\frac{1}{2\pi(a_j - a_i)}\arg\left(\frac{y_k y_i}{y_j^2}\right)\right]$$

Such a configuration determines an FOV by a relative interval between sensors, instead of an absolute interval therebetween, thereby making it possible to secure an extremely wide FOV which used to be very difficult by employing the conventional mono-pulse apparatus.

Meanwhile, setting $|a_j-a_i|=1/2\pi$ for example makes it possible to measure an angle in a zone where the arg( ) and $\sin^{-1}( )$, which are nonlinear functions, indicate a good linearity, by measuring angle by using a part of a value zone of $\arg(y_k y_i/y_j^2)$, thereby enabling a fundamental reduction of an angle measurement error nearby the end of the FOV. Meanwhile, it is a relative interval between sensors that determines an FOV, and therefore it is also easy to make a high gain apparatus by enlarging an individual sensor area size of such without changing an FOV.

Figure 7:
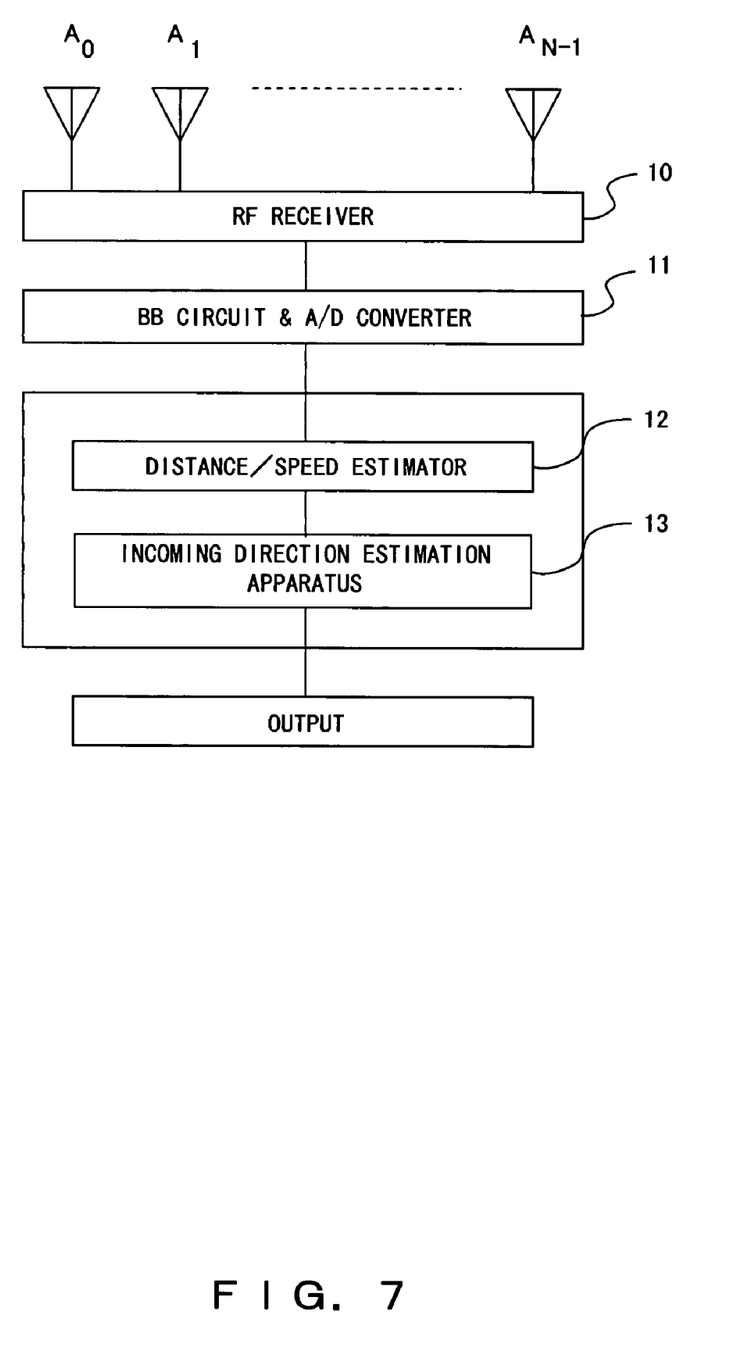
FIG. 7 is a block configuration diagram of a mono-pulse radar incorporating an incoming direction estimation apparatus according to the preferred embodiment of the present invention.

FIG. 7 is a block configuration diagram of a mono-pulse radar incorporating an incoming direction estimation apparatus according to the preferred embodiment of the present invention.

The assumption is that N pieces of antennas (i.e., $A_0$ through $A_{N-1}$) are equipped, in lieu of limiting to three antennas. A radar wave received by these antennas is converted into a baseband signal by an RF receiver 10. The baseband signal is converted into a digital signal by a BB circuit and an analog-to-digital (A/D) converter 11, and also subjected to processing as a baseband signal. Then a distance/speed estimator 12 estimates a distance to a target and a speed thereof by using the processed baseband signal, and the incoming direction estimation apparatus 13 according to the present embodiment estimates an incoming direction of the radar wave from the target. The incoming direction of the radar wave is used as a direction of the target. Once the estimation value of the distance, speed and incoming direction is obtained, it is output to a display or such for presenting to a user or such.

What is claimed is:

1. An incoming direction estimation apparatus, comprising:
   three sensors that detect a signal emerging from a target, the three sensors being arranged to have
      a first distance $d_0$ between a first sensor that detects an intensity $y_0$ and a second sensor that detects an intensity $y_1$ among the three sensors, and
      a second distance $d_1$ between the second sensor and a third sensor that detects an intensity $y_2$ among the three sensors,
   wherein $a_0$ is a number equal to a ratio of $d_0$ and a wavelength $\lambda$ of the signal, $a_1$ is a number equal to a ratio of $d_1$ and $\lambda$, and $|a_1-a_0|$ is equal to or less than 1/4; and
   an estimation unit to estimate an incoming direction of the signal by performing mathematical operations using $|a_1-a_0|$ which is related to relative distances between the three sensors, and ratios $(y_2/y_1)$ and $(y_1/y_0)$ which are related to intensities of the signal detected by the three sensors simultaneously.

2. The incoming direction estimation apparatus according to claim 1, wherein
   said estimation unit estimates the incoming direction of the signal based on $$\theta = \sin^{-1}\left[\frac{1}{2\pi(a_1-a_0)}\arg\left(\frac{y_2 y_0}{y_1^2}\right)\right]$$

where $y_0$ is a first signal received by the first sensor, $y_1$ is a second signal received by the second sensor and $y_2$ is a third signal received by the third sensor.

3. The incoming direction estimation apparatus according to claim 1, wherein
   said estimation unit estimates the incoming direction of the signal based on $$\theta = \sin^{-1}\left\{\frac{1}{2\pi(a_2-a_1)}\sin^{-1}\frac{\sum_i \beta_i \gamma^i}{\sqrt{1+\gamma^2}}\right\}$$

by using $\beta_i$ (where i is an integer) that is set for best estimating an actual incoming angle,
where $\gamma$ is defined as $$\arg\left(\frac{y_2 y_0}{y_1^2}\right) = \tan^{-1}\left[\text{Im}\left(\frac{y_2 y_0}{y_1^2}\right) \Big/ \text{Re}\left(\left(\frac{y_2 y_0}{y_1^2}\right)\right)\right] \equiv \tan^{-1}\gamma.$$

4. The incoming direction estimation apparatus according to claim 3, wherein said $\beta_i$ is determined based on a method of least squares so as to best estimate an actual incoming direction.

5. The incoming direction estimation apparatus according to claim 1, wherein
   said estimation unit estimates the incoming direction of the signal based on $$\theta = \sin^{-1}\left[\frac{1}{2\pi a}\arg\left(\frac{-1 \pm \sqrt{1+4b}}{2}\right)\right]$$

wherein $(y_2+y_1)/y_0 = b$ and $a = d/\lambda$, and $d_1 = d_0 = d$.

6. The incoming direction estimation apparatus according to claim 5, wherein
   an angle L is formed between a straight line, which passes $z=(-1+\sqrt{(1+4b)})/2$, $z^*=(-1-\sqrt{(1+4b)})/2$ and "0" in terms of a method of least squares, and a real axis or imaginary axis on a complex plane as $2\pi a \sin\theta$, and an angle of the incoming direction is estimated based on:

$$\theta = \sin^{-1}\left[\frac{1}{2\pi a}\arg(L)\right],$$

if calculated angle of two incoming directions using z and $z^*$ are not identical.

7. The incoming direction estimation apparatus according to claim 6,
   carrying out a plurality of measurements, calculating a center point of a distribution of values of said z and that of a distribution of said $z^*$ by using a method of least squares and defining the angle L formed between a straight line on a complex plane, which passes the z, $z^*$ and "0" in terms of a method of least squares, and a real axis or imaginary axis as $2\pi a \sin\theta$, and an incoming direction is estimated based on:

$$\theta = \sin^{-1}\left[\frac{1}{2\pi a}\arg(L)\right].$$

8. The incoming direction estimation apparatus according to claim 1,
estimating the incoming direction of a signal based on $$\theta = \sin^{-1}\left\{\sin^{-1}\left[\frac{1}{2\pi a}\operatorname{Re}\left(\frac{y_2 - y_0}{2jy_1}\right)\right]\right\}$$

wherein $a=d/\lambda$, and $d_1=d_0=d$.

9. The incoming direction estimation apparatus according to claim 1, wherein
the mathematical operations include an inverse trigonometric function which is performed by using a Pade expansion.

10. The incoming direction estimation apparatus according to claim 1, wherein
the mathematical operations include an inverse trigonometric function which is implemented by a filter incorporating an expression of inverse trigonometric function applied by a Pade expansion.

11. The incoming direction estimation apparatus according to claim 1, wherein $|a_1-a_0|=1/2\pi$.

12. The incoming direction estimation apparatus according to claim 1, wherein the incoming direction estimation apparatus is applied to a mono-pulse radar.

13. An incoming direction estimation method, comprising:
equipping three sensors for receiving a signal from a target, the three sensors being arranged to have a first distance $d_0$ between a first sensor that detects an intensity $y_0$ and a second sensor that detects an intensity $y_1$ among the three sensors, and a second distance $d_1$ between the second sensor and a third sensor that detects an intensity $y_2$ among the three sensors, wherein $a_0$ is a number equal to a ratio of $d_0$ and a wavelength $\lambda$ of the signal, $a_1$ is a number equal to a ratio of $d_1$ and $\lambda$, and $|a_1-a_0|$ is equal to or less than 1/4 and $\lambda$ is a wavelength of the signal; and
estimating an incoming direction of the signal by performing mathematical operations using $|a_1-a_0|$ which is related to relative distances between the three sensors, and ratios $(y_2/y_1)$ and $(y_1/y_0)$ which are related to intensities of the signal detected by the three sensors simultaneously.

14. An incoming direction estimation apparatus, comprising:
first, second and third sensors to detect a signal, the first, second and third sensor being disposed along a line and having a first distance between the first sensor and the second sensor, and a second distance between the second sensor and the third sensor, a difference between the first distance and the second distance having an absolute value less than or equal to one fourth of a wavelength of the signal; and
an angle estimator to estimate an incoming angle of the signal relative to the line along which the first, second and third sensors are disposed, by performing mathematical operations using the difference between the first distance and the second distance divided by the wavelength, and ratios of intensities of the signal as detected in the first, second and third sensors simultaneously.

* * * * *